US006768851B2

(12) United States Patent
Chiang et al.

(10) Patent No.: US 6,768,851 B2
(45) Date of Patent: Jul. 27, 2004

(54) OPTICAL FIBER FOR ULTRA-HIGH CAPACITY TRANSMISSION

(75) Inventors: Kin Seng Chiang, Kowloon (HK); Vipul Rastogi, Moradabad (IN)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 10/096,556

(22) Filed: Mar. 13, 2002

(65) Prior Publication Data

US 2003/0174984 A1 Sep. 18, 2003

(51) Int. Cl.[7] .............................. G02B 6/18; G02B 6/16
(52) U.S. Cl. ..................................... 385/124; 385/123
(58) Field of Search ................................. 385/123–125

(56) References Cited

U.S. PATENT DOCUMENTS 4,758,066 A * 7/1988 Someda ........................ 385/11
6,480,659 B1 * 11/2002 Patlakh et al. ............... 385/125

FOREIGN PATENT DOCUMENTS

EP 274878 A * 7/1988 ............ G02B/6/10

* cited by examiner

Primary Examiner—John D. Lee
(74) Attorney, Agent, or Firm—Heslin Rothenberg Farley & Mesiti P.C.; Martha L. Boden

(57) ABSTRACT

An optical fiber is described in which a core is surrounded by a cladding having a refractive index that varies periodically in the angular sense around the core. By appropriate design of the cladding it is possible to provide an optical fiber capable of single-mode operation over a wide range of wavelengths with a large effective area.

11 Claims, 9 Drawing Sheets

US 6,768,851 B2

OPTICAL FIBER FOR ULTRA-HIGH CAPACITY TRANSMISSION

FIELD OF THE INVENTION

This invention relates to a novel design for an optical fiber, and in particular to designs for optical fibers that provide a large core single-mode fiber for ultra-high capacity transmission.

BACKGROUND OF THE INVENTION

The most effective way of increasing the transmission capacity of an optical fiber communication system is to use the extremely wide bandwidth of an optical fiber and to feed a large number of channels as is practicable into the fiber. As a consequence of this, the trend has been to extend the communication window from the C-Band to the L-Band and the S-Band so that the communication window covers a total range of about 200 nm.

However, a major obstacle to the development of ultra-wide-band dense wavelength division multiplexing systems are non-linear effects, and in particular the Raman effect, which cannot be managed with dispersion. A direct way to manage such non-linear effects is to use a fiber with a large effective core area, and therefore recently much work has been done on developing such fibers.

PRIOR ART

In 1996 Corning Inc. developed a large-effective-area dispersion-shifted fiber (LEAF) which had an effective core area of about 80 $\mu m^2$, and there are other designs for large-effective-area fibers, one of which shows an effective area of about 100 $\mu m^2$. A single material photonic crystal fiber, a so-called holey fiber, is characterized by a distribution of air holes in the cladding running through the entire length of the cladding and has attracted considerable attention in recent years because it is capable of single-mode operation over a wide range of wavelengths. However, it is difficult to keep the birefringence, and hence the polarization mode dispersion in the fiber, low because of the large index contrast introduced by the air holes.

SUMMARY OF THE INVENTION

According to the present invention there is provided an optical fiber comprising a central core region surrounded by an annular cladding region, wherein said cladding region is formed with a refractive index that varies periodically in the azimuthal direction.

In a preferred embodiment of the invention the cladding region comprises a plurality of alternating segments. In a first and particularly simple embodiment of the invention, the segments may include a first set of segments having a first refractive index alternating with a second set of segments having a second refractive index. The first refractive index may be higher than said second refractive index, and the first refractive index is equal to or less than the refractive index of said core region.

Alternatively, however, as opposed to providing all the segments as step-index segments with a specific refractive index, in other embodiments of the invention at least some of the segments may be formed with a graded index, such that they have a refractive index that varies radially and/or azimuthally. In one preferred embodiment, for example, the refractive index of all the segments is graded azimuthally whereby said cladding region varies smoothly in the azimuthal direction.

In other possible embodiments the duty cycle of the azimuthal periodic variation may be either constant in the radial direction or may vary in the radial direction by selecting the shape of the segments.

According to another broad aspect of the invention there is further provided an optical fiber comprising a central core region surrounded by an annular cladding region, wherein said cladding region is formed with a refractive index that varies periodically in the azimuthal direction, wherein said cladding region is formed of a plurality of segments at least some of which are formed with a graded refractive index.

BRIEF DESCRIPTION OF THE DRAWINGS

Some embodiments of the invention will now be described by way of example and with reference to the accompanying drawings, in which:—

DETAILED DESCRIPTION OF PREFERRED EMBODIMENTS

Figure 1:
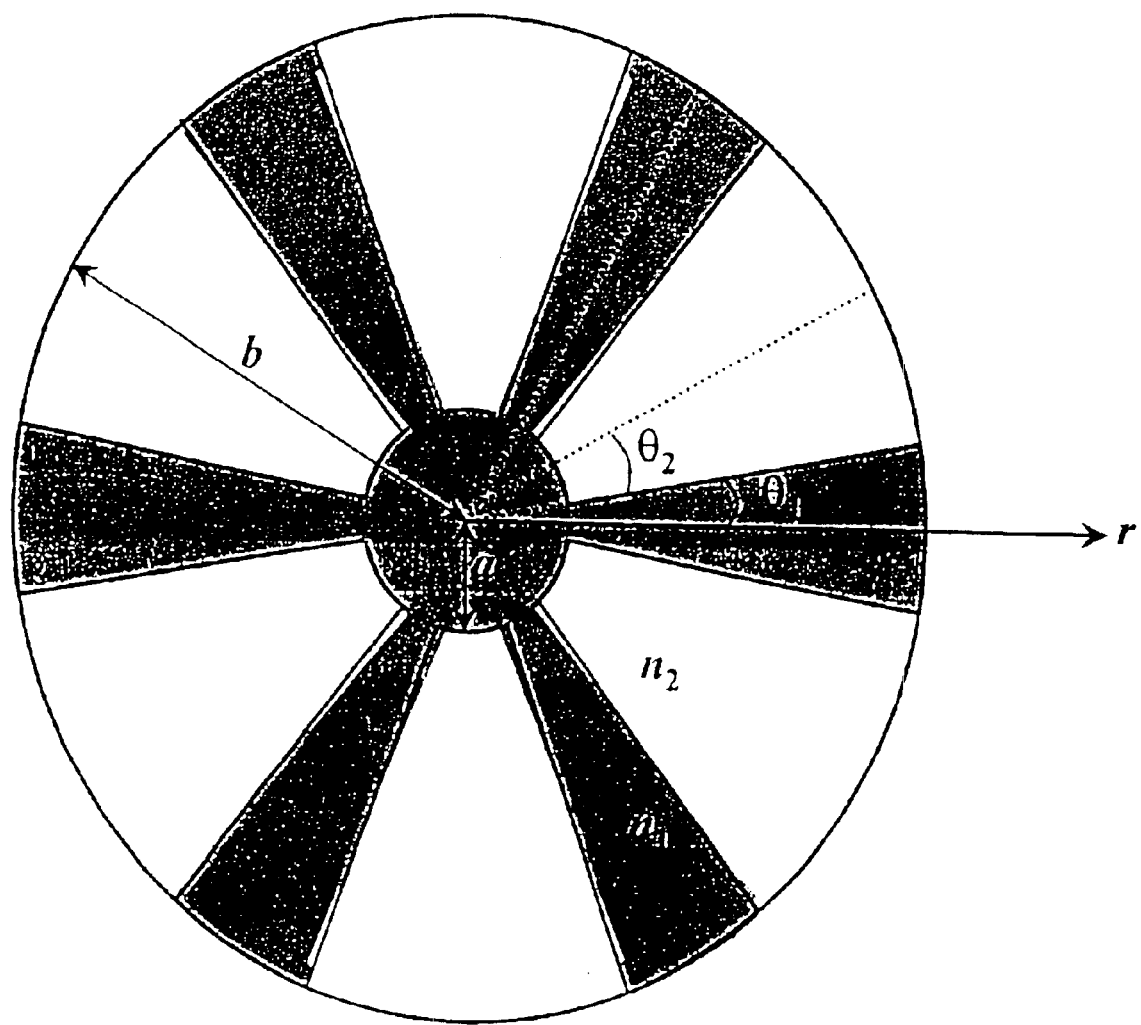
FIG. 1 is a sectional view through an optical fiber according to a first embodiment of the invention.

FIG. 1 shows the transverse cross section of an optical fiber according to a first embodiment of the invention. The fiber comprises a uniform core region (0<r<a) of refractive index $n_1$ and a region (a<r<b) in which the refractive index varies periodically in an angular or azimuthal sense. In this embodiment of the invention, the periodic angular variation of the refractive index is achieved by alternating periodic segments of high-index ($n_1$) medium of angular width $2\theta_1$ and low-index ($n_2$) medium of angular width $2\theta_2$. The period and the duty cycle of the segmentation are given by $\Lambda = 2\theta_1 + 2\theta_2$ and $\gamma = 2\theta_2/\Lambda$, respectively. The refractive index of the high-index segments is the same as the refractive index of the core region. This is advantageous as it allows the high index segments to be made of the same material as the core, but it is not essential. However, the refractive index of the core must not be lower than the maximum index in the cladding. It should also be noted that the terms "high" and "low" in this context are relative. In practice the difference between the "high" and "low" indices may be in the range of only about 0.3% to 3%.

The structure is truncated by an air cover beyond the radius b. The fiber is uniform in the axial direction, which is the direction of wave propagations. In this embodiment six periods of segmentation are provided, but other numbers of periods are within the contemplation of this invention.

The transmission properties of the optical fiber of this embodiment can be calculated mathematically using the radial effective-index method (REIM) based on the following analysis:

The relative index difference between the high-index and low-index regions is in fact small and so it can be assumed that the transverse component of the electric field satisfies the scalar wave equation, which can be expressed in the cylindrical coordinate system as $$\frac{\partial^2 \phi}{\partial r^2} + \frac{1}{r}\frac{\partial \phi}{\partial r} + \frac{1}{r^2}\frac{\partial^2 \phi}{\partial \theta^2} + k^2[n^2(r,\theta) - n_{eff}^2]\phi = 0 \tag{1}$$

where $\phi(r,\theta)$ is the field, $k=2\pi/\lambda$ is the free-space wave number with $\lambda$ the wavelength, $n(r,\theta)$ is the refractive-index distribution, and $n_{eff}$ is the mode index. The optical fiber can be analyzed efficiently by the radial effective-index method because this method is particularly accurate for structures with approximate circular symmetry. The method should be accurate for analysing the structure of the optical fibers in accordance with the invention provided that the number of periods is sufficiently large (>4 for example).

In general, the field can be written as $$\phi(r,\theta) = \phi_r(r)\phi_\theta(r,\theta). \tag{2}$$

In the radial effective-index method, the field $\phi_\theta(r, \theta)$ is assumed to be a slowly varying function of r compared with $\phi_r(r)$, i.e., the field $\phi(r,\theta)$ is quasi-separable in the radial and angular directions. With this assumption, an azimuthally uniform effective-index profile $n_{eff,r}(r)$ cab be defined and the azimuthal component of the field $\phi_\theta(r,\theta)$ together with $n_{eff,r}(r)$ can be solved point-wise from $$\frac{d^2\phi_\theta(r_i,\theta)}{d\theta^2} + k^2[n^2(r_i,\theta) - n_{eff,r}^2(r_i)]r_i^2\phi_\theta(r_i,\theta) = 0 \tag{3}$$

subject to the boundary condition $\partial \phi_\theta/\partial \theta = 0$ at $\theta=0$ and $\theta=\theta_1+\theta_2$, where $r_i$ represents a particular value of r. With the knowledge of the effective-index profile $n_{eff,r}(r)$, the radial component of the field $\phi_r(r)$ and the mode index can then be solved from the following equation:

$$\frac{d^2\phi_r}{dr^2} + \frac{1}{r}\frac{d\phi_r}{dr} + k^2[n_{eff,r}^2(r) - n_{eff}^2]\phi_r = 0. \tag{4}$$

This method reduces the original structure to an equivalent circular fiber with an index profile $n_{eff,r}(r)$. This results in tremendous simplification in terms of computation. Furthermore, analytical solutions for the effective-index profile $n_{eff,r}(r)$ can be derived and the matrix method can be employed to solve Eq.(4).

Figure 2:
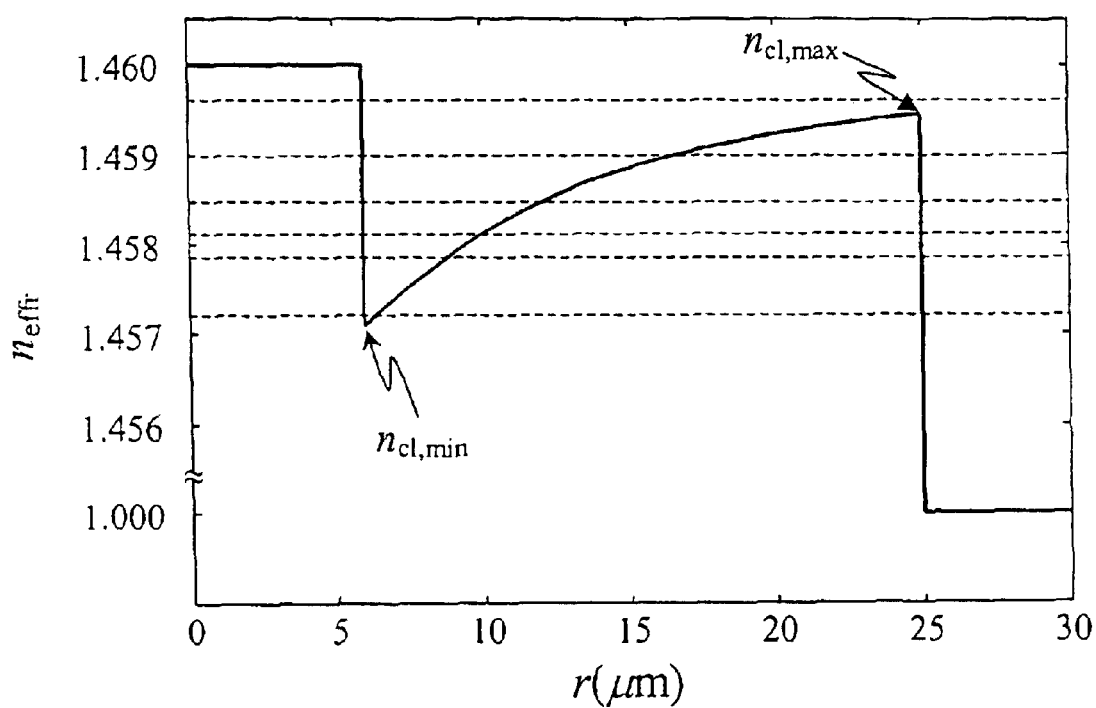
FIG. 2 is a plot of the effective-index profile of the fiber of FIG. 1, FIGS. 3 (a)–(c) are plots in the embodiment of FIG. 1 of (a) the radial parts of the field profiles of the fundamental mode and the higher-order mode at a wavelength of 632.8 nm, (b) the contour of the intensity distribution for the fundamental mode, and (c) the contour of the intensity distribution for the higher-order mode.

In the embodiment of FIG. 1 $n_1=1.46$, $n_2=1.455$, $a=6$ $\mu$m, $b=25$ $\mu$m and $\gamma=2.4/\pi$. Using REIM analysis as described above, FIG. 2 shows the effective-index profile $n_{eff,r}(r)$ of the structure at the wavelength 632.98 nm, together with the mode indices of a number of quasi-cylindrically-symmetric modes (dashed lines). These modes correspond to the $LP_{0m}$ modes of a conventional circular fiber. As shown in FIG. 2, the effective cladding index is non-uniform and varies monotonically with r from the minimum value $n_{cl,min}$ to the maximum value $n_{cl,max}$. It can be seen that only the mode index of the fundamental mode is larger than $n_{cl,max}$ and all the others are smaller than $n_{cl,max}$. This implies that the fundamental mode is a guided mode with its field confined in the core region, while the high-order modes are cladding modes.

Figure 3:
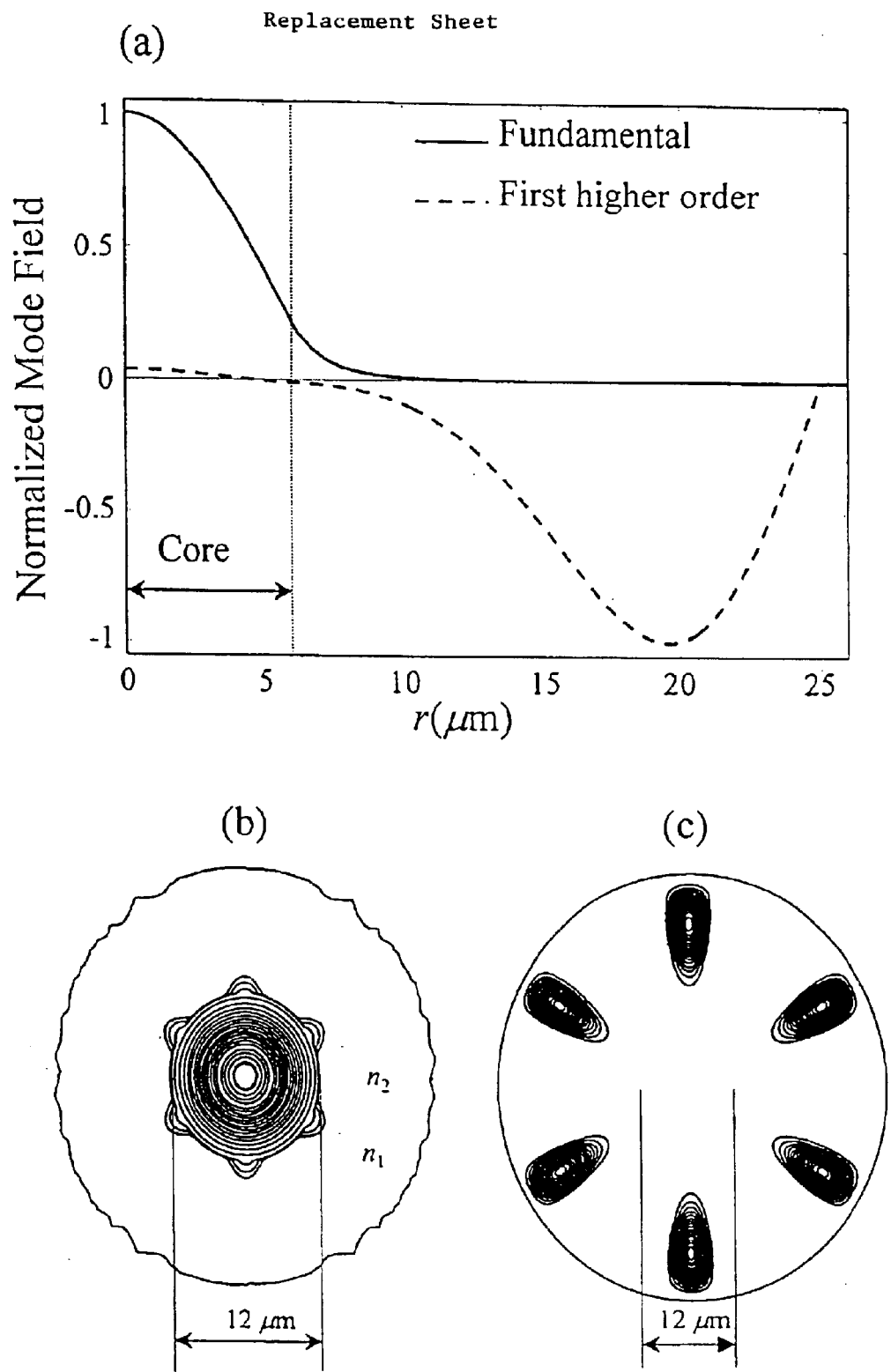

FIG. 3 plots the radial parts of the fields and the intensity distributions of the fundamental mode and the higher-order quasi-cylindrically-symmetric mode in the first embodiment of the invention. As shown clearly in FIG. 3, the fundamental mode is well guided in the core and the higher-order mode is a cladding mode. In fact, this is the case for the entire wavelength range from 350 nm to 1500 nm. As the cladding modes can be easily stripped off by using a suitable index-matching medium as the cover material, this fiber offers the possibility of single-mode operation over a wide range of wavelengths.

Figure 4:
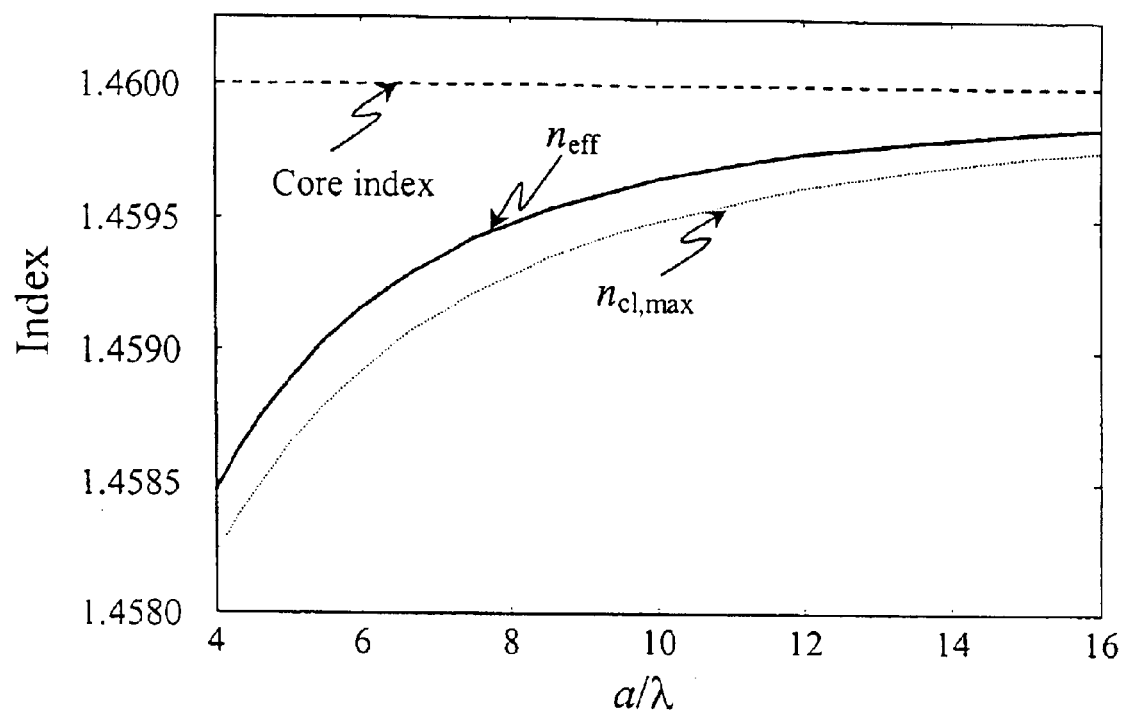
FIG. 4 is a plot of the dispersion curve (solid line) for the fundamental mode, refractive index of the core (dashed line) and effective cladding index (dotted line) for an embodiment according to FIG. 1.

The dispersion characteristics of the fundamental mode of the optical fiber of the first embodiment of the invention are presented in FIG. 4, which shows that, together with the mode index $n_{eff,r}$, the cladding index $n_{cl,max}$ increases with the decrease in wavelength.

Figure 5:
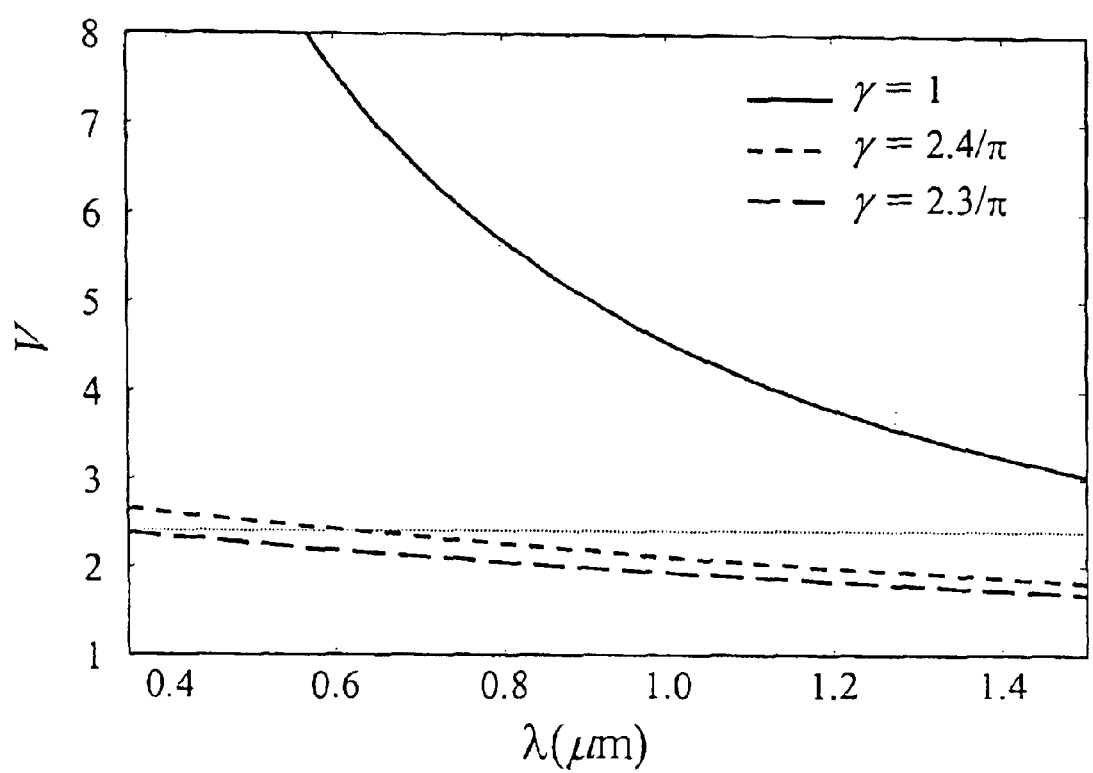
FIG. 5 is a plot of the variation of a normalized frequency against wavelength for the embodiment of FIG. 1.

To further illustrate the endless single-mode operation characteristics of a fiber in accordance with the first embodiment of the invention, a normalized frequency for the fiber may be defined as $V=2\pi(a/\lambda)(n_1^2-n_{cl,max}^2)^{1/2}$, which is comparable to the effective V parameter used for a holey fiber. The single-mode regime of the fiber can be identified by plotting the parameter V against the wavelength. The results calculated for different duty cycles of the periodic angular variation of the refractive index are shown in FIG. 5, where $\gamma=1$ represents the limiting case of a conventional step-index fiber. As in the previous studies, V=2.4048 is used as the cut-off value of V to separate the single-mode and multimode regimes of the fiber.

The important observation from FIG. 5 is that, for a conventional step-index fiber, V tends to infinity as the wavelength approaches zero, whereas for a fiber in accordance with an embodiment of the invention, V appears to converge to a finite value as the wavelength approaches zero. It is thus possible for the V value of a fiber in accordance with an embodiment of the invention to remain smaller than the cut-off V value of the first higher-order mode at extremely short wavelengths. As shown in FIG. 5, the single-mode regime depends strongly on the duty cycle of the segmentation. With $\gamma=2.4/\pi$, the single-mode regime ends at around 600 nm, while with $\gamma=2.3/\pi$, it is extended to below 400 run. For the values of $\gamma$ below $2.3/\pi$, the fiber does not support any guided mode at 1500 nm. For a conventional step-index fiber with a core index of 1.46 and a cladding index of 1.455, the maximum core diameter required for single-mode operation at 400 nm is about 2.5 $\mu$m. However, by means of an embodiment of the present invention, the core diameter is 12 $\mu$m, which is nearly 5 times larger.

Figure 6:
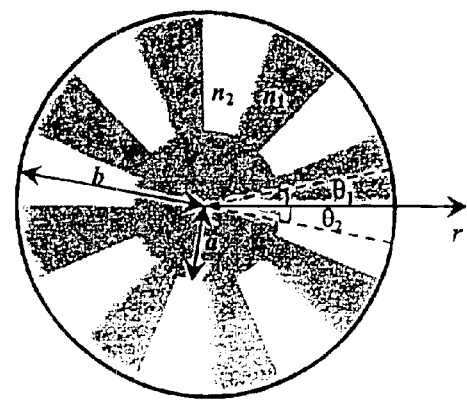
FIG. 6 is a sectional view through an optical fiber according to a second embodiment of the invention, FIGS. 7(a) and (b) are plots of (a) the effective index profile of the embodiment of FIG. 1 at a wavelength of 1.55 $\mu m$ together with the mode indices for the first three modes of the fiber, and (b) the intensity distribution of the fundamental mode.

FIG. 6 shows the cross-section of a fiber according to a second embodiment of the invention. As with the first embodiment of the invention, the fiber has a uniform core region (0<r<a) of refractive index $n_1$, and a segmented cladding (a<r<b), which consists of periodic segments of high-index ($n_1$, ie the same refractive index as for the core region) medium of angular width $2\theta_1$ and low-index ($n_2$) medium of angular width $2\theta_2$. The period and the duty cycle of the segmentation are given by $\Lambda=2\theta_1+2\theta_2$ and $\gamma=2\theta_2/\Lambda$, respectively. In this embodiment eight periods of segmentation are provided such that the period is $\pi/4$, while $\theta_1=\theta_2$ and thus the duty cycle is 0.5.

Figure 7:
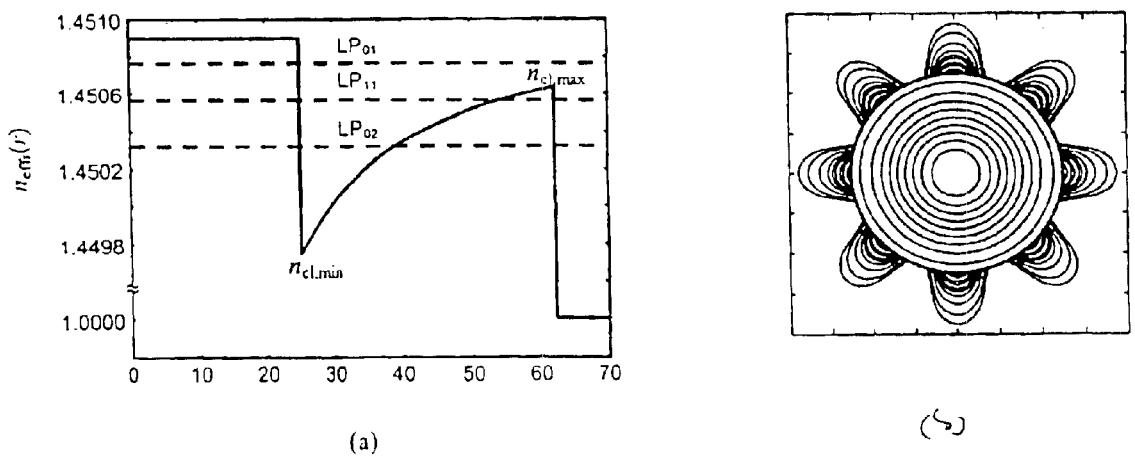

In this embodiment of the invention the fiber is formed of a 50 μm-core segmented cladding fiber (SCF) with a standard cladding diameter of 125 μm, i.e., a=25 μm, b=62.5 μm, and with $n_1=1.4509$, $n_2=1.4439$ (a relative index difference of ~0.5%), and $\gamma=\theta_2/(\theta_1+\theta_2)=0.5$. Using REIM analysis as described above, at a wavelength of 1.55 μm, the fiber of the present invention can be considered as an equivalent circular fiber with an effective index profile $n_{\mathit{eff}}(r)$ as shown in FIG. 7(a), where the mode indices calculated for the first few modes of the fiber are also given. The core index of the equivalent fiber is the same as that of the original fiber (i.e., $n_1$), while the cladding index of the equivalent fiber is non-uniform and varies monotonically with r from the minimum value $n_{cl,min}$ at the core-cladding boundary to the maximum value $n_{cl,max}$ at the edge of the cladding. It can be seen from FIG. 7(a) that the mode index of the fundamental mode (the $LP_{01}$ mode) is larger than $n_{cl,max}$, and all the others are smaller than $n_{cl,max}$, which implies that the fundamental mode is a core mode, whereas the high-order modes are cladding modes. As the cladding modes can be easily stripped off by use of a suitable index-matching medium as the cover material, the fiber is effectively a single-mode fiber at 1.55 μm—but it has a core diameter of 50 μm. The contour plot of the intensity distribution for the fundamental mode at 1.55 μm calculated by the REIM is shown in FIG. 7(b). Clearly, the mode field is mainly confined in the core region of the fiber with some penetration into the cladding region through the high-index segments.

Figure 8:
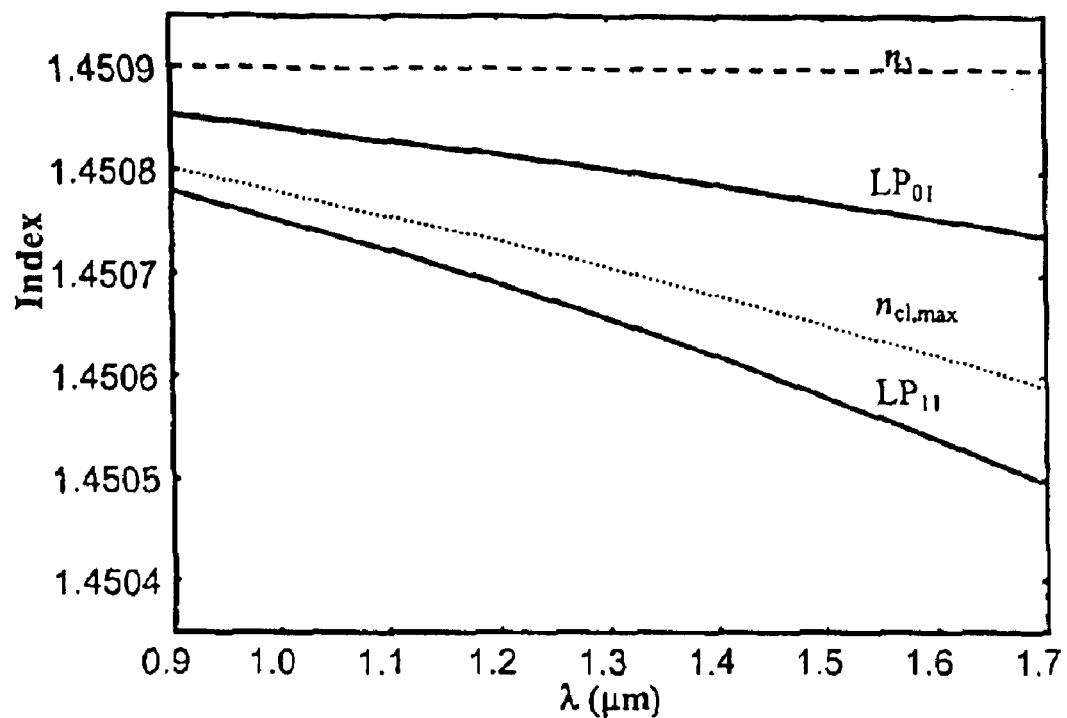
FIG. 8 is a plot of the dispersion curves for the fundamental mode and the first higher order mode for the embodiment of FIG. 6 together with the effective cladding index.

The dispersion characteristics of the $LP_{01}$ and $LP_{11}$ modes of the fiber of this second embodiment of the invention are presented in FIG. 8, which shows that, together with the mode indices, the peak cladding index $n_{cl,max}$ increases with the decrease in wavelength. It can be seen that, over an extended range of wavelengths, the $LP_{01}$ mode index is larger than $n_{cl,max}$ and is larger than the $LP_{11}$ mode index, indicating that the 50 μm-core of the fiber of this embodiment remains effectively single-moded in the entire range of wavelengths shown in FIG. 8. This range covers not only the three bands at 1.55 μm but also the window at 1.3 μm. The $LP_{11}$ mode becomes a core mode at the wavelength ~850 nm.

It should be noted that while in the abovedescribed embodiments of the present invention the periodic angular variation in the index is of a step-like manner alternating between high-index $n_1$ and low-index $n_2$, with each alternating segment formed of substantially a single specific refractive index, it is also possible that the alternating segments may be formed with a graded index (either radially and/or azimuthally) so that the periodic angular variation in the index may be a smooth variation rather than a step-like variation. Providing the segments with a graded index would provide the advantage of enabling the index profile to be tailored to fine tune the performance of the fiber.

Figure 9:
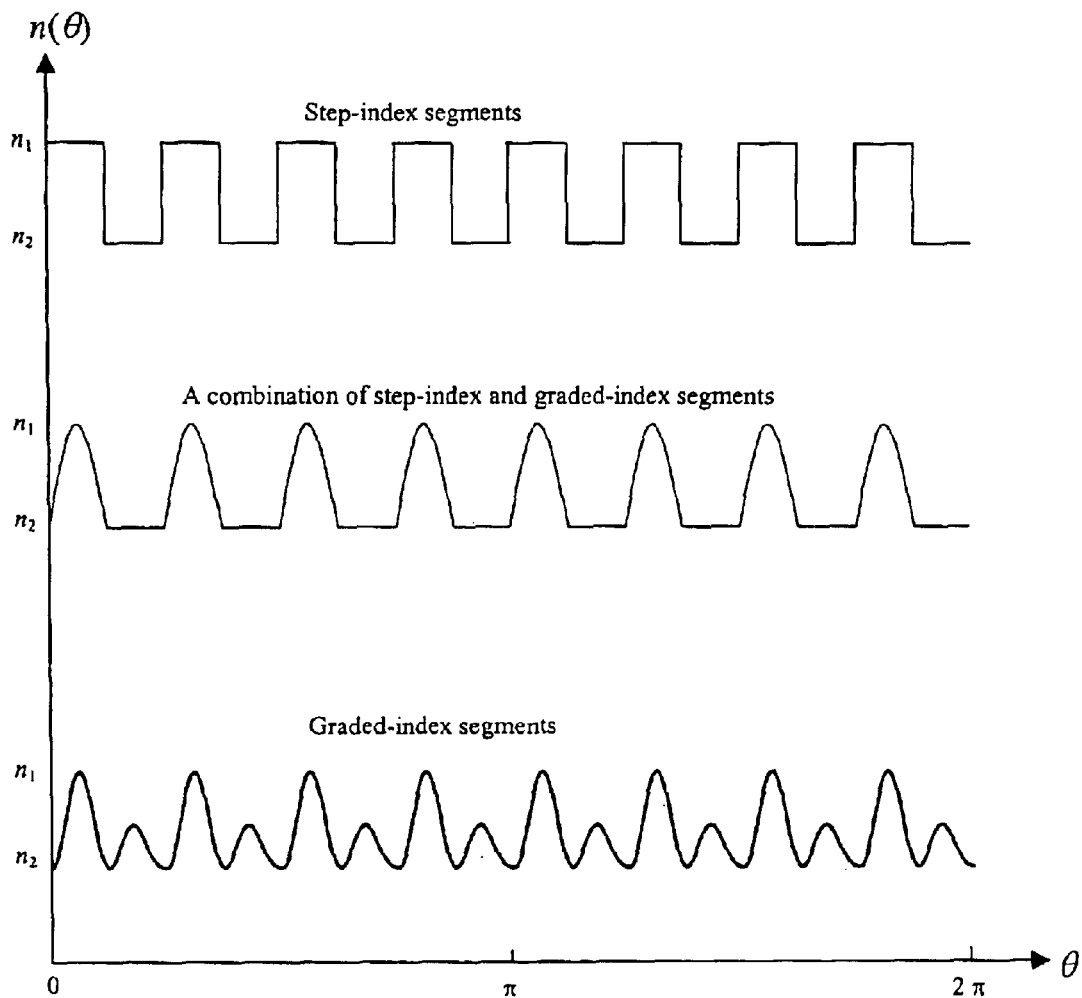
FIG. 9 illustrates how the refractive index may vary in the azimuthal direction.

FIG. 9 illustrates three examples of how the refractive index of the cladding can vary in the angular direction around the core. The top line illustrates step-index segments as in the two examples in which each segment has a single specific refractive index. The line below that combines step-index segments as the low index segments, while the high-index segments are graded-index segments. In the bottom line, both the high-index and the low-index segments are graded-index segments so that there is a continuous smooth variation in the refractive index of the cladding around the core.

Figure 10:
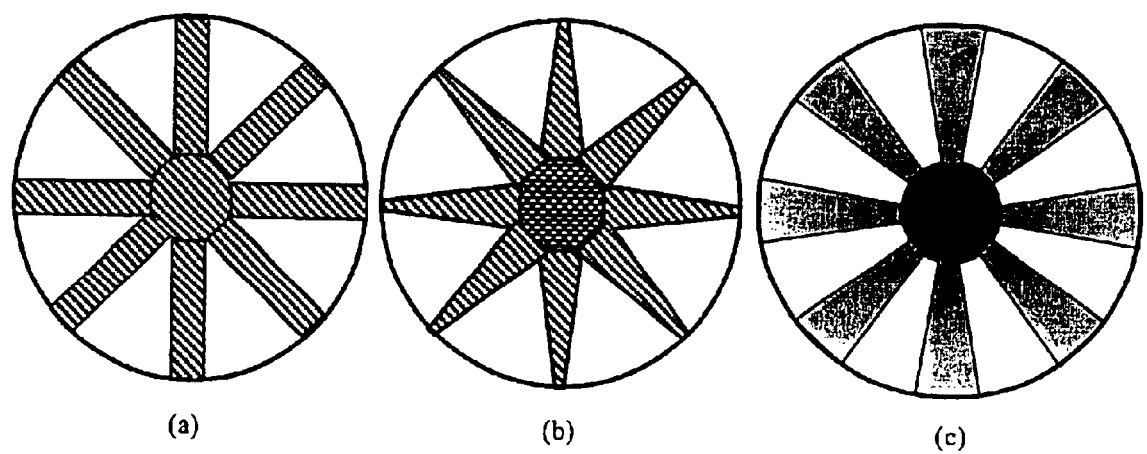
FIGS. 10(a)–10(c) illustrate how the properties of the cladding may vary in the radial direction.

In addition to the cladding having a periodic variation in the angular direction, the properties of the cladding can also be varied radially. For example the shape of the cladding segments can be varied as shown in FIGS. 10(a)–(c). In FIG. 10(a) the high-index segments have a rectangular section, while in FIG. 10(b) the high-index segments taper in the radially outward direction, and in FIG. 10(c) the high-index segments taper in the radially inward direction. It should be noted that in FIGS. 10(a)&(b) because of the shape of the segments the duty cycle of the angular periodic variation will vary radially (whereas the duty cycle is radially constant in FIG. 10(c)). In addition to radial variation of the duty cycle, the refractive index in the cladding may also be graded in the radial direction. For example, in FIG. 10(c) the refractive index of the high-index segments is a graded-index radially such that it decreases in the radially outward direction.

By varying the various parameters of the fiber, such as by providing graded-index (radially and/or azimuthally) segments, and by varying the duty cycle, the periodicity of the angular periodic variation in refractive index, and by varying the difference between the high and low indices in the cladding, the dispersion properties of the fiber can be controlled to give a desired result.

It will thus be seen that the present invention, at least in its preferred forms, provides an optical fiber that is capable of functioning as a single-mode fiber over a wide range of wavelengths (eg from about 900 nm to about 1700 nm) including importantly the approximately 200 nm wide communication window that is centered on 1550 nm, and with a large core diameter (for example 50 μm). However, this is only an example and many fibers could be designed using the principles of this invention with other single-mode ranges.

What is claimed is:

1. An optical fiber comprising a central core region surrounded by an annular cladding region, wherein said cladding region is formed with a refractive index that varies periodically in the azimuthal direction, and wherein said fiber is operable as a single mode fiber over a wavelength range of from about 400 nm to about 1700 nm.

2. An optical fiber as claimed in claim 1 wherein said cladding region comprises a plurality of alternating segments.

3. An optical fiber as claimed in claim 2 wherein said segments include a first set of segments having a first refractive index alternating with a second set of segments having a second refractive index.

4. An optical fiber as claimed in claim 3 wherein said first refractive index is higher than said second refractive index, and wherein said first refractive index is equal to or less than the refractive index of said core region.

5. An optical fiber as claimed in claim 2 wherein at least some of said segments are formed with a graded index.

6. An optical fiber as claimed in claim 5 wherein said at least some graded index segments have a refractive index that varies radially and/or azimuthally.

7. An optical fiber as claimed in claim 6 wherein the refractive index of all the segments is graded azimuthally whereby the refractive index of said cladding region varies smoothly in the azimuthal direction.

8. An optical fiber as claimed in claim 1 wherein the duty cycle of the azimuthal periodic variation is constant in the radial direction.

9. An optical fiber as claimed in claim 1 wherein the duty cycle of the azimuthal periodic variation varies in the radial direction.

10. An optical fiber as claimed in claim 1 wherein the refractive index of said cladding region changes through at least four periods around the circumference of said fiber.

11. An optical fiber comprising a central core region surrounded by an annular cladding region, wherein said cladding region is formed with a refractive index that varies periodically in the azimuthal direction, wherein said cladding region is formed of a plurality of segments at least some of which are formed with a graded refractive index, and wherein said fiber is operable as a single mode fiber over a wavelength range of from about 400 nm to about 1700 nm.

* * * * *